UNITED STATES PATENT OFFICE.

REUBEN R. BROWN, OF BUFFALO, NEW YORK.

IMPROVEMENT IN LUBRICATING COMPOUNDS.

Specification forming part of Letters Patent No. 22,621, dated January 18, 1859.

*To all whom it may concern:*

Be it known that I, REUBEN R. BROWN, of the city of Buffalo, in the county of Erie and State of New York, have invented certain new and useful Improvements in the Composition of Matter to be Used as a Lubricator for Axles, Journals, &c.; and I do hereby declare that the following is a full and exact description of the ingredients and proportions used in said composition and the manner of compounding the same.

To make one gallon of my improved "lubricator," take three quarts of weak lye, (from wood-ashes,) one-quarter of a pound of common bar soap, and two grains of saltpeter, and mix them well together in a wooden vessel. Then take one ounce of sulphur and one quart of oil (common fish-oil) and grind the sulphur in the oil. Then pour the sulphur and oil into the vessel containing the lye, soap, and saltpeter and thoroughly mix the whole together, and the composition is ready for immediate use. These ingredients should be compounded substantially in the proportions herein specified, whether in large or small quantities, and without subjecting them to artificial heat.

This composition makes an excellent, cheap, and durable lubricator for axles of railroad-cars, journals, &c., and all rubbing metallic surfaces. It may be used with equal facility in cold or warm weather and at all seasons of the year, and will prevent the axles, journal, &c., from "heating," and will not "gum." It is well adapted for general use.

I claim—

A lubricator made of the ingredients and in the proportions substantially as herein set forth.

REUBEN R. BROWN.

Witnesses:
    E. B. FORBUSH,
    W. H. FORBUSH.